Oct. 7, 1958 L. E. LEE 2,854,822
PNEUMOHYDRAULIC-ELECTRIC SYSTEM
Original Filed Jan. 20, 1954 6 Sheets-Sheet 1

FIG. I

INVENTOR
LUTHER E. LEE

BY
ATTORNEYs

Oct. 7, 1958 L. E. LEE 2,854,822
PNEUMOHYDRAULIC-ELECTRIC SYSTEM
Original Filed Jan. 20, 1954 6 Sheets-Sheet 3

FIG. 4

INVENTOR
LUTHER E. LEE
BY
ATTORNEYS

Oct. 7, 1958  L. E. LEE  2,854,822
PNEUMOHYDRAULIC-ELECTRIC SYSTEM
Original Filed Jan. 20, 1954  6 Sheets-Sheet 4

INVENTOR
LUTHER E. LEE
BY
ATTORNEYS

Oct. 7, 1958 L. E. LEE 2,854,822
PNEUMOHYDRAULIC-ELECTRIC SYSTEM
Original Filed Jan. 20, 1954 6 Sheets-Sheet 5

FIG. 7 CHASING CYCLE

INVENTOR
LUTHER E. LEE
BY
ATTORNEYS

Oct. 7, 1958   L. E. LEE   2,854,822
PNEUMOHYDRAULIC-ELECTRIC SYSTEM
Original Filed Jan. 20, 1954   6 Sheets-Sheet 6

FIG. 8   TURNING CYCLE

INVENTOR
LUTHER E. LEE
BY
ATTORNEYS

United States Patent Office 2,854,822
Patented Oct. 7, 1958

2,854,822

PNEUMOHYDRAULIC-ELECTRIC SYSTEM

Luther E. Lee, Takoma Park, Md.

Original application January 20, 1954, Serial No. 405,267. Divided and this application January 18, 1955, Serial No. 482,682

3 Claims. (Cl. 60—97)

(Granted under Title 35, U. S. Code (1952), sec. 266)

The invention described herein may be manufactured and used by or for the Government of the United States for governmental purposes without the payment of any royalties thereon or therefor.

The instant application is a division of application Serial No. 405,267, filed by Luther E. Lee on January 20, 1954 for Machine Tool.

The present invention relates to a pneumohydraulic-electric system for machine tools and more particularly to such a system particularly well adapted for effecting the automatic operation of a machine tool designed for turning and chasing operations.

It is contemplated by this invention that by the use of a relatively high pressure directed fluid coolant projected from an appropriately located nozzle to an area immediately proximate the cutting edge of the working tool and the work, appreciably greater tool life and higher rates of metal working will be realized thus contributing to increased production and greater economy.

The present invention also provides a novel pneumohydraulic-electric system which will feed the cutting tool of a machine tool into the work in preselected increments for each cut or stage of a cut. Furthermore, in the present invention upon completion of a forward cutting stroke the tool will be returned automatically to its initial starting position and the tool will be advanced to another cutting increment prior to commencing another working cycle.

Another object of this invention is to provide a fluid pressure system for projecting fluid under high pressure to a particular area adjacent the cutting edge to prolong tool life at increased working rates.

A further object is to provide power operated means for automatically advancing a tool into the work in preselected increments.

Another object of this invention is to provide a fluid pressure system for selectively controlling and operating a group of working machine tool elements and for supplying the elements with a high pressure fluid as required in the cycle of operation.

Still another object of this invention is to provide a novel valve system to control selectively the flow of fluids in a hydraulic system.

Still another object of this invention is to provide a hydraulic system for traversing a carriage between selected positions on a machine tool.

Another object of this invention is to provide a fluid system including a pumping means actuated by low pressure fluid and operative to supply a fluid at relatively high substantially constant pressure.

A further object of this invention is to provide a fluid system for automatically advancing a work tool in preselected increments or retracting a work tool in accordance with a desired work cycle.

A further object of this invention is to provide a fluid system in which the fluid operates a toolholder and functions as a coolant for the tool and work.

Still another object of this invention is to provide in a machine tool, a pneumohydraulic-electric system capable of directing and controlling automatically the operation of a lathe for selective turning or chasing movement.

Other objects and many of the attendant advantages of this invention will be readily appreciated as the same becomes better understood by reference to the following detailed description when considered in connection with the accompanying drawings wherein.

Figure 1:
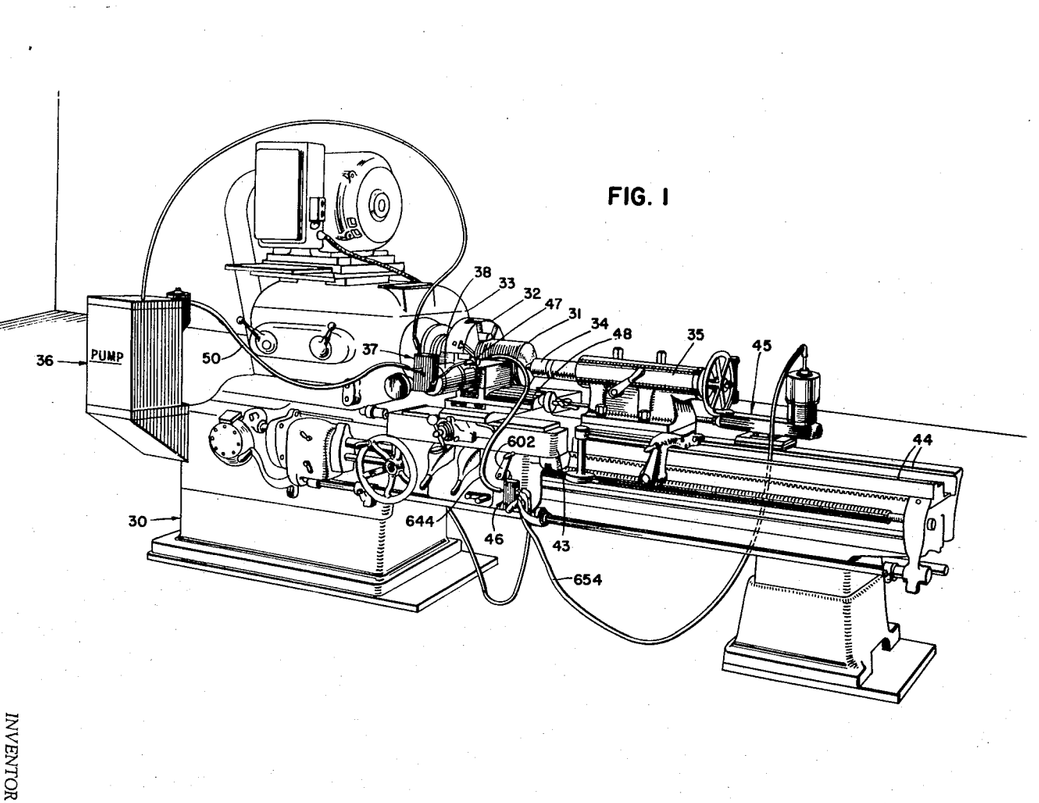
Fig. 1 is a perspective view of an engine lathe embodying the pneumohydraulic-electric system of the present invention.

Referring to the drawings, and particularly to Fig. 1 wherein one embodiment of the present invention, designed for semiautomatic operation, is illustrated attached to a conventional engine lathe 30 in which a workpiece 31 is supported between the chuck 32 mounted on the head stock 33 and the center 34 on the tailstock 35. The lathe with conventional accoutrements has been modified slightly to accommodate the components of the present invention which broadly comprises a system of conduits and control valves connected to a nozzle assembly mounted on the toolholder of the machine, the said nozzle assembly being constructed and arranged so as to direct said high pressure fluid adjacent the cutting surfaces of the tool at a high velocity and a pressure in excess of 450 p. s. i. to provide and maintain a cooling effect along the vital tool surfaces by removing the generated heat with sufficient promptness to prevent any appreciable heat effects that might injure either the tool or the work being operated upon by the tool.

The tool holder with its nozzle assembly, is secured to a turning and chasing head 38 which is mounted on a tool carriage 43 adapted to have longitudinal movement along the lathe bed ways 44. The turning and chasing head 38 supports a control valve 37 interposed in the fluid transmitting line 50 and leads from the pump 36 to the toolholder head 38 which serves as a conduit to pass the pressure fluid to the nozzle assembly. When the internal mechanism of the valve 37 is conditioned to permit flow therethrough fluid under pressure will: (1) supply hydraulic pressure within the body of the head sufficient to project a ram on which the toolholder 40 is mounted into the workpiece 31, and (2) supply pressure fluid to the nozzle assembly through the head 38. An indexing mechanism 47 operable in conjunction with the turning and chasing head 38 and actuated in sequence with the position of the lathe carriage will condition the head 38 for successive tool movement by the movement of the ram in accordance with a preselected plan for chasing or turning operations.

A carriage return mechanism 45 affixed to the tool carriage 43 is conditioned for movement through the selector valve 46, which valve when actuated either automatically or manually at the end of a cutting stroke will admit a low pressure fluid medium into the return mechanism to return the carriage, upon which the turning and chasing head is mounted, to the initial cutting stroke position. The selector valve 46 disposed between the carriage return mechanism 45 on the one side of the system, and the indexing mechanism 47 and control valve 37 on the other side of the system, will transmit a fluid actuating medium through the conduits 644, 654 to the side of the system determined by the carriage position.

Figure 2:
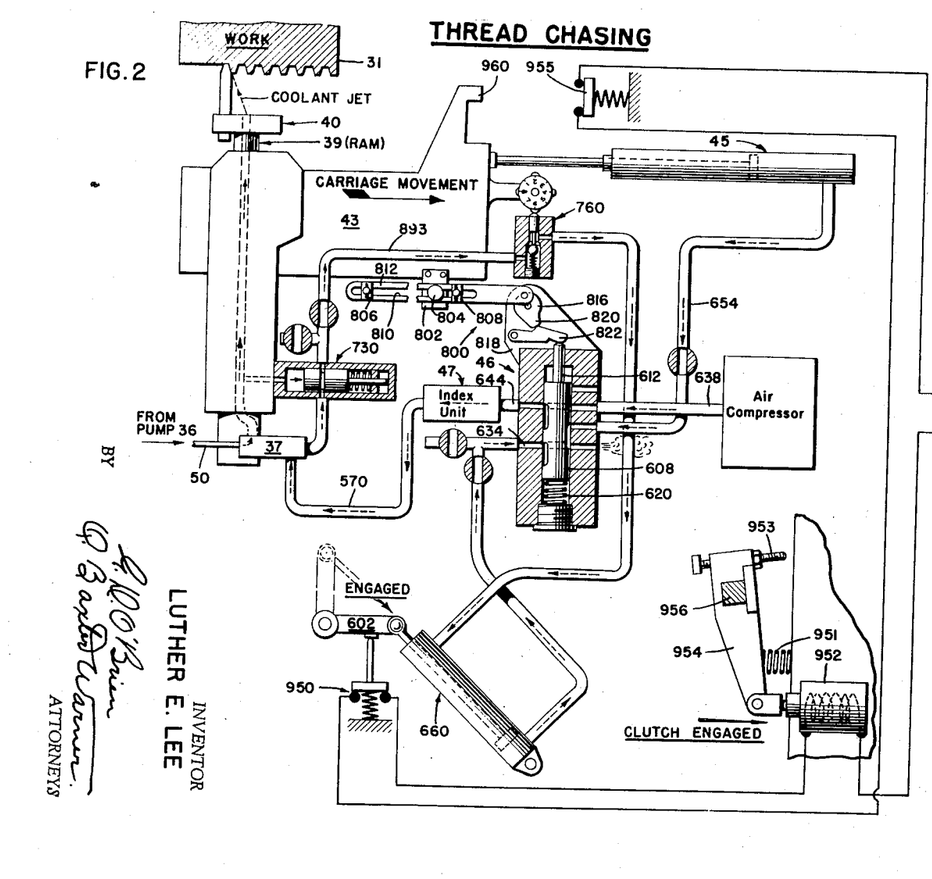
Fig. 2 is a diagrammatic view showing the relative positions of the components of the system when the tool carriage is moving in the forward cutting stroke in an embodiment of the invention in which the automatic chasing operation is controlled by mechanical means.
Figure 3:
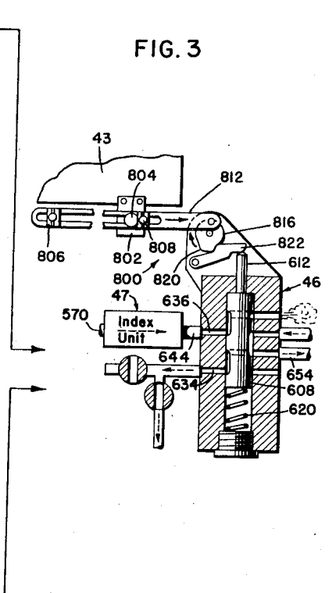
Fig. 3 is a detailed fragmentary change position view illustrating the position of the selector valve upon completion of the forward cutting stroke.

Automatic lathe operation utilizing a mechanical linkage to sequentially control the functioning of the lathe components is shown by the linkage arrangement 800 as illustrated in Figs. 2 and 3. In Fig. 2 the carriage is shown traveling in the forward cutting stroke and in Fig. 3 the carriage is returning to the initial position to prepare for another forward cutting stroke.

A carriage supported bracket 802 supports a stud 804 which is received in an elongated slot 810 in a longitudinally shiftable bar 812 so that upon carriage movement the stud 804 will move along the slot 810 between spaced limit blocks 806 and 808 which are adjustalby positioned along slot 810 on the extended cam actuating bar 812. Bar 812 is mounted within a suitable guide bracket (not shown) at one end and pivotally connected at the other end to a cam 816 to which longitudinal movement of the bar will impart an arcuate movement. Cam 816 is mounted for short oscillatory movement on the abutment plate 818 which extends from the selector valve 46. By providing a suitably positioned rise 820 on the periphery of the cam 816 that will engage and pivot the selector valve operating pawl 822 which is also mounted on the plate 818, the selector valve 46 will be made to function in accordance with the position of the carriage as translated to the bar 812 and cam 816. For example, in the initial forward cutting stroke position the lathe carriage is to the left and fluid flow must be in the direction of the indexing mechanism 47 and the control valve, etc., therefore, the piston 608 in the selector valve 46 must be depressed so that the actuating fluid from the air compressor will pass through the open valve, see operation of selector valve above, and enter the lines 644, 570 to condition the carriage for forward movement. To perform this function the stud 804 will engage the left limit block 806 and slide bar 812 to rotate the cam 816 counterclockwise so that the cam rise 820 will pivot the pawl 822 which will then depress and hold the valve piston 608 in the desired open position. As the carriage travels to the right, the stud 804 sliding within the slot 810, moves the bracket 802 along the lathe ways but the cam continues to dwell on the pawl until the stud 804 strikes the right limit block 808 in order to rotate the cam 816 clockwise so as to remove the cam holding force upon the pawl which will enable the spring 620 to raise the valve piston 608 to the closed position as illustrated in Fig. 3. In this released or closed position, actuating fluid flow will be from the air compressor through the closed valve to the carriage return line 654 to actuate the carriage return mechanism and thereby return the carriage to the left limit block 806 during which time interval the cam will dwell in the disengaged position illustrated in Fig. 3 until the stud strikes the left limit block 806 to shift the bar 812 to the left to rotate the cam 816 in a counterclockwise direction. Thus, carriage movement for the desired chasing distance may be adjusted to within set limits on the bar 812 by positioning the spacer blocks within the slot at the starting and stopping points desired.

The overall operation of the system which will include the operational sequence of the thread indicator valve, the half nut lever, the clutch, and the other lathe components will be described in detail hereinafter.

Figure 4:
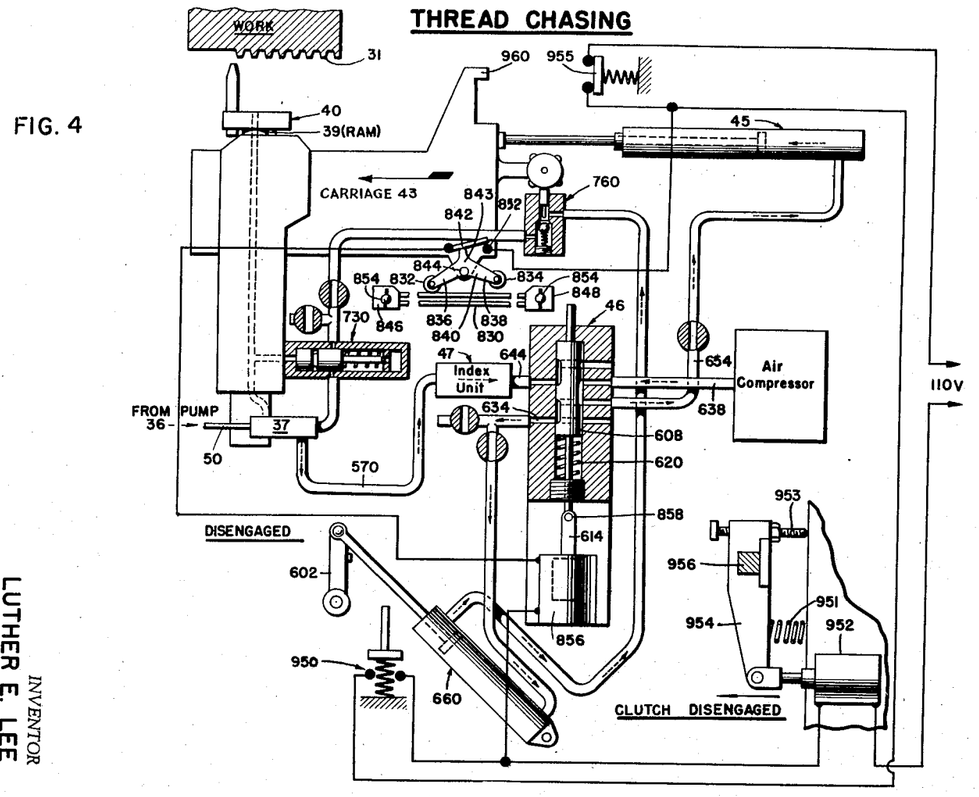
Fig. 4 is a diagrammatic view showing the relative positions of the parts when the tool carriage is moving in the return stroke in an embodiment of the invention in which the automatic chasing operation is controlled by electromechanical means.

Automatic chasing operations may be performed by utilizing electromechanical means that are responsive to the position of the tool carriage to sequentially control the movement of the selector valve which will in turn transmit fluid energy to actuate the various components. Referring to Fig. 4 there is illustrated one means for actuating a solenoid operated valve which will effectuate movement of the valve piston in the desired direction.

A combined chasing and turning bar 830 is secured to an accessible straight section on the lathe bed adjacent to the longitudinally moving carriage so that bar follower rollers 832, 834 fastened to the extending arms 836, 838, respectively, on the bell crank 840, which is pivotally mounted on the stud 844 to operate the microswitch 842, will make contact with the straight flat section of the bar 830. The microswitch 842 is fastened to the lathe carriage for movement therewith so that the position of the toolbit may be correlated with the point of tangency of the roller 834 and the turning and chasing bar strip 830. Spaced limit stop blocks 846, 848 are spaced along the strip 830 in accordance with the desired chasing distance on the workpiece. Wing nuts and bolts 854 engaging the blocks provide the necessary convenient adjustable features for the length of stroke required on the workpiece. A third arm 843 of the bell crank is a trip arm which will engage with the switch contact 842 to trip the microswitch depending upon a position of a roller 832 or 834 as one of the two rollers moves along and maintains contact with the strip. Microswitch 842 is electrically connected through a suitable circuit to the solenoid 856 which is mechanically fastened to the rod 614 on the selector valve piston 608 by the connecting pin 858. Solenoid 856 is in the closed position when the valve piston 608 is in the position illustrated in Fig. 4 so that fluid flow will be from the supply line 638 through the valve 46 to the carriage return mechanism line 654. This condition is reached when the carriage completes the forward cutting stroke and the roller 834 on the bell crank 840 strikes the right limit block 848 which will pivot the bell crank counterclockwise thereby opening the switch 852 and the circuit to release the holding force on the spring 620 in the selector valve which will move the piston 608 to the position illustrated in Fig. 4. The selector valve 46 will remain in this closed position as the carriage is returned by the carriage return mechanism until the left roller 832 strikes the left limit block 846 which will pivot the bell crank thus closing the contact 852 and circuit. The microswitch 842 will operate the solenoid 856 to retract the valve piston 608 against spring tension to open the valve. Fluid flow will then be cut off from the carriage return mechanism and be directed to the power operated head, indexing mechanism, and control valve, etc. The position of the valve during the forward cutting stroke is similar to the position shown in the mechanical system of Fig. 2.

Figure 5:
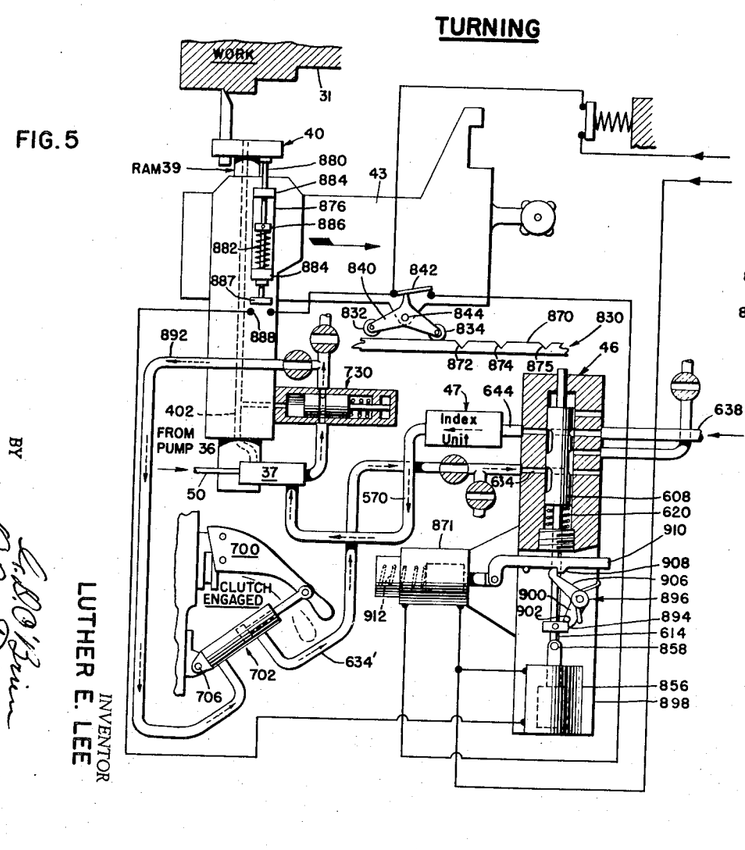
Fig. 5 is a diagrammatic view illustrating the relative positions of the parts when the tool carriage is moving in the forward cutting stroke in an embodiment of the invention in which the automatic turning operation is controlled by electromechanical means.
Figure 6:
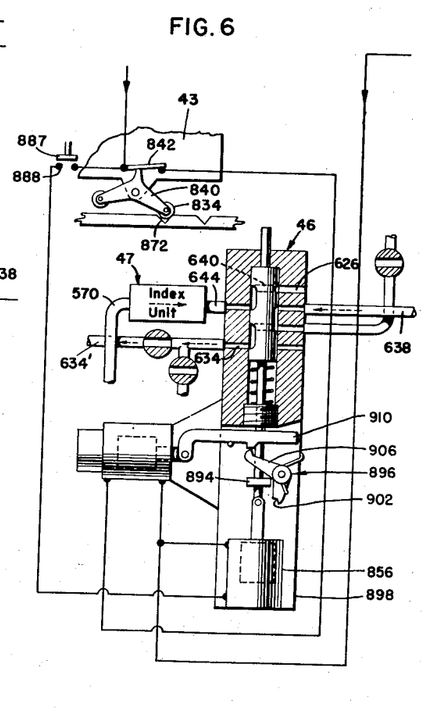
Fig. 6 is a detailed fragmentary change position view illustrating the position of the selector valve in order to permit reorientation of the toolholder head to a new position during a turning operation.

When the lathe is to be set up for turning operations, as illustrated in Figs. 5 and 6, the power operated toolholder will be modified from the former chasing set up by incorporating spacer blocks on a collar which will be released for rotation from a keyway in the cover plate of the toolholder the collar may be rotated with the spacer blocks as an indexing mechanism engages successive teeth on a rotating ring, as disclosed in the afore-mentioned parent application. The turning and chasing strip 830 mounted on the rear of the lathe, as described in the electromechanical phase of chasing operations, will be shifted laterally so that section 870 will be exposed to rollers 832, 834 on the bell crank 840 which actuates the solenoid 871 through the microswitch 842 by a making and breaking contact. By providing that the height of the level section 870 on the turning portion of the bar 830 is slightly higher than the chasing strip portion, the roller 834 will ride on the level section during which time the selector valve piston 608 in the selector valve will be in the open position to admit fluid to the indexing mechanism and control valve; and pressure will be exerted on the ram 39 to force the toolbit into the workpiece for the turning cut. Spaced notches 872, 874 and 875 in the turning strip represent the length of the change in diameter of a section to be turned on a workpiece as transposed to the strip surface. That is, the distance between notches 872, 874, and from 874, 875 on the strip represents the length of workpiece to be turned at a constant diameter. Correlated with the position of the notches on the strip are pairs of spacer blocks mounted within the turning head, described in detail in the power operated tool mechanism. As the roller 834 enters into the notch 872 the bell crank 840 is pivoted clockwise into the closed switch position so that the carriage will stop feeding until the toolholder head is repositioned by movement of the indexing mechanism to present another set of spacer blocks against which piston lugs will strike. The toolbit is then oriented to a new position relative to the workpiece as pressure is again applied to the toolholder head.

Mounted on the lathe carriage adjacent the turning and chasing head is an adjustable bracket 876 which supports a slidable plunger 880 that is urged by the spring 882, positioned between one of the stops 884 and the bracket plunger guide 886, toward the toolholder support bracket 40. A contact 887 for the switch 888 is provided on the rear of the bracket in alignment with the rear of the plunger so that as fluid pressure is cut off from the ram 39 by means of valve 37, a spring (not shown) will urge the ram 39 to a retracted position thus venting the remaining fluid pressure behind the ram 39 to valve 37 which will then port this fluid pressure through a line (not shown) to the pump 36. Thus, the toolholder and the ram 39 will retract the toolholder bracket 40 which will strike and move the spring urged plunger rearwardly thereby making contact with the switch 888 which is electrically connected to the spring urged solenoid 856. Upon retraction of the toolholder 40 the solenoid 856 will hold the selector valve 46 in the open position as illustrated in Fig. 5.

Timely positioning of the selector valve must be coordinated with the position of the toolbit and in order to carry out the correct sequence electrical solenoids 856 and 871 are employed. Solenoid 856 is mechanically linked by the pin 858 to the plunger rod 614 which has a pawl arm engaging lug 894 thereon. During turning operation when the solenoid 856 is actuated momentarily by the rearward movement of the toolholder 40, the solenoid 856 will open the valve piston 608 to permit fluid flow to the indexing mechanism and control valve. A spring urged holding pawl 896 is pivotally connected to the bracket 898, which pawl extends from the selector valve body and is out of the path of movement of the rod 614 and has an arm 900 with a recess 902 that will engage the lug 894 as the solenoid 856 moves to open the selector valve. The latch arm 906 of the pawl 896 cooperatively engages the detent 908 on a cocking lever arm 910 which is linked to the solenoid 871. The arm 910 is normally held in an extended position as shown in Fig. 5 by a compression spring 912.

To illustrate the operation of the electrical system, reference will be made to Figs. 5 and 6 which illustrate the conditions existing in turning a section on a workpiece. The roller 834 rides on the flat section 870 of the turning strip at which time the microswitch 842 is in the open position and the spring 912 will extend the arm 910 so that arm 910 will engage the latch arm 906. The solenoid 856 which is momentarily actuated during rearward movement of the toolholder 40 is retracted for a sufficient time so that while the selector valve 46 is in the open position the lug 894 will strike and pivot the arm 900. Thus, the lug 894 will engage in the recess 902 enabling the arm 900 to hold the solenoid 856 retracted against the tension of spring 620. The latch arm 906 of arm 900 will engage the detent 908 on the cocking arm 910 which now serves as a releasing lever for the selector valve when the solenoid 871 is actuated. As the roller 834 drops into the notch 874 in carriage movement to the right the bell crank 840 will rotate clockwise to close the mocroswitch 842 thereby actuating solenoid 871 which will then overcome the tension of spring 912 and slide the arm 910 to the left and in so doing the latch arm 906 will be pivoted counterclockwise. When the latch arm 906 pivots it will also pivot arm 900 away from the lug 894 allowing the tension of spring 620 to close the valve, thus cutting off fluid flow to the indexing mechanism and the control valve.

Now the general overall system and the interrelationship of the various components with respect to each other will be described for (1) manual operation, (2) automatic chasing operation utilizing mechanical control linkages, (3) automatic chasing operation utilizing an electromechanical control means, and (4) automatic operation for turning.

In a manual operation set up for chasing, the cover member on the power operated toolholder is moved forward so that a key engages within a keyway after the requisite tolerances for the depth of cut in the workpiece have been set between two collars in the manner indicated in the parent application Serial No. 405,267, hereinbefore mentioned. In the forward stroke position the half nut lever 602 is timely rotated downwardly manually to engage the lead screw and in so doing the lever depresses piston 608 of selector valve 46. Low pressure fluid, such as air, is then admitted from supply line 638 through the selector valve 46 and will pass through line 644, (1) to the indexing mechanism 47 to set the position of the collar and, (2) to the control valve 37 to have the piston therein operate a plunger so that high pressure fluid from the pump 36 will flow into the head chamber of the power operated toolholder to force the ram and the toolholder 40 with the toolbit and nozzle assembly thereon toward the workpiece 31. As the forward cutting pass is completed the half nut lever 602 is raised manually thereby permitting the spring 620 to move the selector valve 46 into the closed position so that low pressure fluid will then flow from the supply line 654 into the carriage return mechanism 45; and, once fluid flow is cut off to the turning and chasing head, the control valve 37 cuts off high pressure fluid from the pump to the ram 39. As fluid pressure is built up in an accumulator, not shown, on the carriage return mechanism, oil or a similar fluid is then forced into the elongated carriage return mechanism cylinder to displace the piston and rod therein with the lathe carriage attached thereto in a return stroke movement to assume the initial starting position preparatory for another forward cutting stroke. When the carriage has returned to the initial starting position with the tool adjacent the starting point the half nut lever 602 is again rotated clockwise to open the selector valve which will supply low pressure fluid into the indexing mechanism and control valve, thereby conditioning the tool for the next forward cutting stroke.

For automatic chasing operation employing the mechanical linkage shown in Figs. 2 and 3, the length of the section to be chased on the workpiece is transposed to the bar 812 by adjusting the limit stops 806 and 808. In the forward cutting stroke position, as shown in Fig. 2, the low pressure fluid medium will pass through the now opened selector valve 46 to the indexing mechanism 47 and the control valve 37. When sufficient pressure is built up in the chamber of the power operated toolholder by the pressure fluid admitted from the pump 36, the ram and toolbit will be advanced into the workpiece 31 and fluid will flow through the head via an appropriate passage and out of the nozzle assembly onto the toolbit and workpiece. With sufficient chamber pressure in the toolholder head the pressure conditioning valve 730 will open to pass low pressure fluid therethrough to the thread indicator dial valve 760. At the start of a chasing stroke, with the half nut lever 602 disengaged, the rotating thread indicator brings one of the projecting studs into contact with the end of the indicator valve plunger to open the indicator valve 760. As fluid under low pressure passes through the indicator valve 760 the half nut operating mechanism 660 will pivot the half nut lever 602 into the engaged driving position. Upon engagement of the half nut lever with the lead screw, the dial will cease to rotate and the lever in the engaged position will make contact with the switch 950 that operates solenoid 952 to shift the head stock clutch into the engaged driving position by pivoting the clutch bar bracket 954 which rotates the clutch bar 956 connected thereto.

During the forward cutting stroke the lathe carriage will move to the right and the stud 804 will move in the slot 810 in the bar 812 until the stud contacts the right limit 808 at which time the bar 812 will be shifted to the right to rotate the cam 816 clockwise permitting the pawl 822 to release pressure on the rod 612, see Fig. 3. As the valve is shifted to the closed position fluid supply to the forward side of the half nut operating mechanism will be cut off and diverted to the back side of the mechanism so as to shift the lever into the disengaged position. Upon the initial upward pivotal movement of the half nut lever, contact with switch 950 will be broken and the spring 951 will pivot the bracket 954 with the clutch bar 956 into the disengaged position as illustrated in Fig. 4. By providing an adjustable bolt 953 on the end of the bracket, clutch engagement may be regulated. In the event that the carriage moves to the right overriding the right limit stop 808 the projection 960 on the lathe carriage will contact a switch 955 which is connected in the circuit with the clutch operating solenoid 952 and upon switch contact the clutch will be disengaged. Upon disengagement of the lever from the lead screw low pressure fluid will enter the line 654 leading to the carriage return mechanism which will return the lathe carriage to the original starting position.

During return movement as the carriage approaches the initial starting position the stud 804 on the carriage will strike the left limit block 806 and further carriage movement will slide the bar 812 so as to rotate the cam 816. Rotation of the cam 816 will force the pawl 822 against the plunger 612 and thereby open the selector valve thus repeating the operating sequences.

For automatic chasing operation, Fig. 4, with the electromechanical means the length of the chasing section of the turning and chasing strip may be set up for travel to correspond with the length of travel of the toolbit relative to the workpiece by adjusting end limit stops 846 and 848 on the strip 830. The microswitch 842 is connected in the circuit to actuate the solenoid 856 so that when the roller 832, moving with the carriage, travels to the left on a return stroke, the circuit will be open and the selector valve will be in the closed position as illustrated in Fig. 4. During movement in the forward cutting stroke direction the roller 834 will make contact with the strip 830 to actuate the microswitch 842 thereby completing the circuit through the solenoid 856 which will open the selector valve. After the job set up has been completed, the turning and chasing head will be adjusted to advance the toolbit into the work in the desired increments in the manner described in the aforementioned parent application, Serial No. 405,267.

For the initial forward cutting stroke the carriage will be to the left thus placing the left roller 832 on the left limit stop 846 on the chasing strip with the right roller 834 contacting the level surface of the strip thereby closing the circuit which will operate solenoid 856 to open the selector valve. Low pressure fluid, air preferably, will pass through the selector valve 46 and into the indexing mechanism 47 to condition the head to the next position of tool advance. Low pressure fluid will flow to the control valve 37 on the head to operate a piston therein which will open the valve 37 to admit high pressure fluid from the pump into the head chamber behind the ram in the toolholder. When sufficient pressure is built up in the chamber, the ram will advance the toolbit into the workpiece, preferably at a desired starting position for which the work may be recessed and also, the pressure conditioning valve 730 communicating with the chamber pressure will open so that the low pressure fluid will flow toward the thread indicator valve 760 awaiting to be opened as a projection on the rotating indicator dial strikes the plunger of the thread indicator valve. As soon as the plunger is contacted and depressed low pressure fluid will flow to the forward side of the half nut lever operating mechanism 660 to rotate the half nut lever 602 into the engaged position with the lead screw. As the half nut lever completes its movement into the engaged position the lever will engage the switch 950 which is connected in the circuit with the solenoid 952. Operation of the solenoid 952 is such that when the half nut lever is in the engaged position the solenoid 952 will operate to pivot the bracket 954 so that the bracket will pivot the head stock clutch bar 956 to move it into the operating position, that is, the engaged position.

As the carriage progresses to the right during the forward cutting stroke and approaches the end of the forward stroke the right roller 834 will strike the right limit 848 and will be pivoted counterclockwise into the switch open position. When the microswitch 842 is forced into the open position by pivotal movement of the bell crank the circuit to the solenoid 856 is opened and the spring 620 will force the piston 608 into the valve closed position as illustrated in Fig. 4. Selector valve 46 closes with no delay. However, valve 730 will remain open for a sufficient length of time to allow venting of residual pressure in half nut lever operating mechanism 660 through valve 37, index unit 47 and the appropriate vent of selector valve 46. High pressure build up and release in ram 39 is controlled by valve 37 at a slower rate than the low pressure circuit controlled by selector valve 46. In this valve closed position (1) the indexing mechanism and control valve are vented back through the selector valve and fluid pressure to the forward side of the half nut lever piston is cut off, the piston having been previously vented, but air from the supply line 638 passes through the recesses in the valve piston to the passage 634 and through the fluid line to the backside of the half nut lever operating mechanism 660 to disengage the half nut from the lead screw; and also as the half nut lever is pivoted from the engaged position the microswitch 950 actuates the solenoid 952 to disengage partly or completely the clutch by pivoting the bracket 954 which is attached to the clutch bar 956; and (2) air is supplied through the selector valve to the line 654 and into the carriage return mechanism 45 which will return the lathe carriage to the initial position, in the manner described in the afore-mentioned parent application Serial No. 405,267.

A safety switch 955, connected in this electrical circuit with the clutch solenoid 952, is mounted on the lathe at a suitable position from the carriage so that in case the carriage moves in its forward cutting stroke beyond the right limit stop a contact will be made with the projection 960 on the carriage to actuate the clutch solenoid and thereby prevent further carriage travel.

As the carriage is returned to the initial position the selector valve will remain closed until the left roller 832 strikes the left limit stop 846 at which time the microswitch 842 will be moved to the closed position in order to open the selector valve 46 and the cycle is repeated after the indexing mechanism orients the head to the next advanced position.

Figure 7:
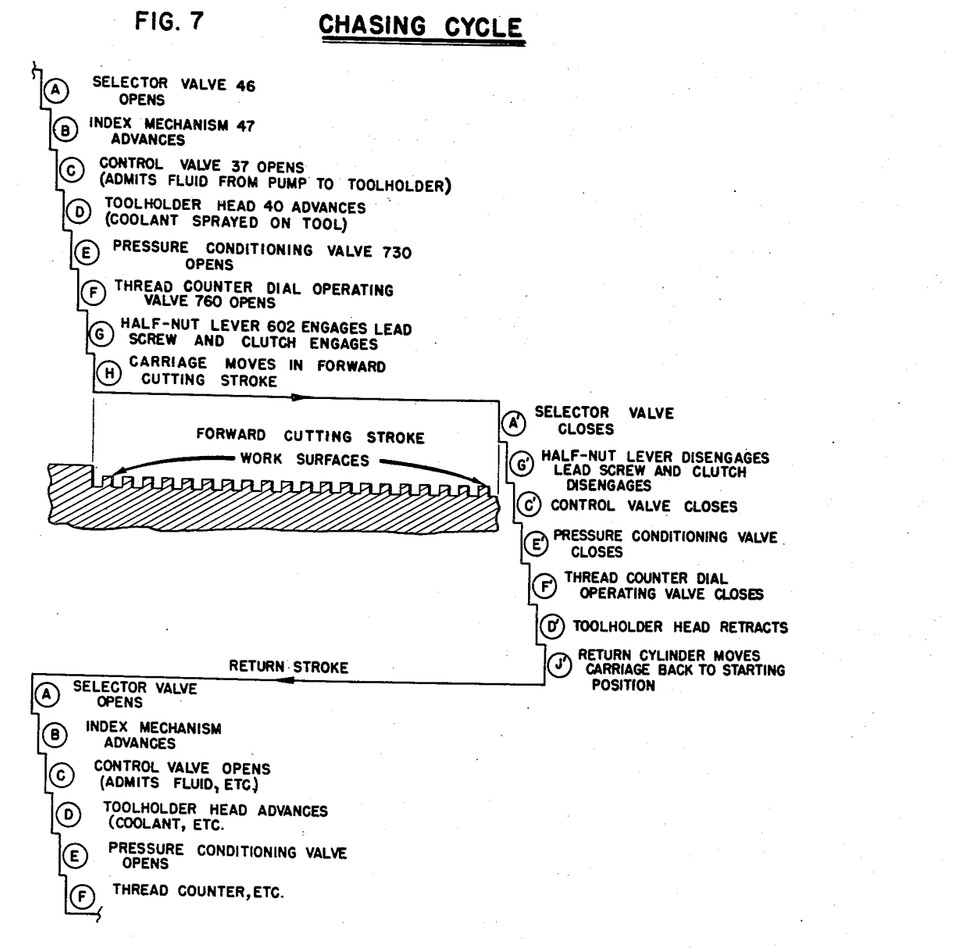
Fig. 7 illustrates in graphic form the operating sequence during automatic chasing.

Fig. 7 represents in graphical form the sequence of operations for various components as employed in the chasing cycle and will be self-explanatory. Although the position for each operation representing a different component is offset to indicate a delay or time interval before operation of the next component in the sequence, these delays are but momentary and operation of several components may occur simultaneously. Rapidity in the sequence depends on how quickly each component may begin or complete the cycle before a related or dependent component may begin to function.

For automatic turning operation (see Figs. 5 and 6) the turning section 870 of the turning and chasing strip will be oriented with respect to the travel of the roller 834. Notches 872, 874 and 875 in the turning section of the strip are located to correspond to the change in diameters desired on the workpiece. Correlated with the position of the notches on the strip are pairs of spacer blocks mounted within the turning head, described in detail in the afore-mentioned parent case, so that as the roller 834 contacts a notch 872, 874 or 875 in the turning strip a change of position of the spacer block collar within the power operated tool mechanism will present a new set of spacer blocks for the next turning operation. Initially the spring urged pawl 896 is made to hold the selector valve in the open position when the solenoid 856 is retracted and the trip lever or cocking lever 910 of the extended plunger 614 to solenoid 871 will maintain the pawl 896 in engagement with the lug 894 on the selector valve in the open position. At this stage, fluid under low pressure, preferably air, will be admitted from a pressure source, shown as an air compressor, to and passed through the selector valve 46 to the indexing mechanism 47 to position the spacer blocks arranged in sequence on the collar. In addition, low pressure fluid will be admitted to the control valve 37 to operate the piston therein so that fluid under high pressure from the pump 36 will be admitted to the chamber in the power operated head and to the nozzle assembly. As sufficient pressure is built up in the chamber in the power operated head the pressure conditioning valve 730 will open to pass low pressure fluid through the line 892 to the feed lever operating mechanism 702 which will move the feed lever 700 into the engaged position, as illustrated in Fig. 5, conditioning the carriage for travel in the forward cutting stroke until the roller strikes the notch 872 in the strip 830. When the roller contacts the notch 872 the microswitch 842 will close the circuit to the solenoid 871 thereby moving the cocking lever to the left, as shown in Fig. 6, which will pivot the pawl 896 to the left releasing the lug 894 from the recess 902 thus permitting the spring 620 to force the selector valve to the closed position.

In the closed position of the selector valve low pressure fluid is diverted through the valve piston 608 in the valve so that fluid will flow through the valve into the line 634' to the opposite side of the feed operating mechanism 702 to disengage the feed lever 700 which stops forward carriage travel. Therefore, almost simultaneously with the stopping of the carriage the following occurs when the selector valve is released and moves into the closed position, as illustrated in Fig. 6, (1) low pressure fluid in the control valve and the indexing mechanism is vented back through the recess 640 in the valve piston 608 and the vent 626 in the selector valve housing thus a control valve piston in valve 37 closes and cuts off high pressure fluid from the pump 36 to the head chamber behind the ram in the toolholder and the pressure fluid will then be returned to the pump by spring return action of ram 39 forcing the remaining pressure fluid through valve 37 which in turn will then port the fluid to pump 36 by means of a return line (not shown); reduction in head chamber pressure will close the pressure conditioning valve 730 thereby cutting off low pressure fluid supply to the feed lever actuating mechanism 702, with fluid pressure reduction in the head chamber in the toolholder the action of a compressed spring (not shown) in the toolholder will retract the toolholder piston, ram and toolbit conditioning the spacer blocks for subsequent movement, and (2) in the closed position of the selector valve low pressure fluid will flow through the supply line 638 into the line 634' and through the open valve to the backside of the feed lever mechanism to force the feed lever into the disengaged position, illustrated by the broken lines in Fig. 5. Residual low pressure fluid in feed lever mechanism 702 will have been previously vented at this time by means of valve 730 which closes at a slower rate than selector valve 46 because of a slower rate of high pressure fluid reduction in ram 39. At this point in the turning operation the carriage movement has stopped to await repositioning of the power operated toolholder and of the toolbit. As pressure is relieved within the head chamber, after a momentary delay caused by the gradual dissipation of pressure in the head chamber, the ram with the attached toolholder will be retracted by spring action and the bottom of the toolholder 40 will strike the plunger operated switch 887 thus closing the circuit to solenoid 856 which solenoid operation will then open the selector valve. Upon opening of the selector valve the following occurs, as illustrated in Fig. 5, air flows immediately into the indexing mechanism 47 to orient the spacer blocks to a new position, and the low pressure fluid continues to flow into the control valve 37 to force a piston therein to move a rocker arm in order to depress a plunger which then admits high pressure fluid into the head chamber as described in the aforementioned parent application. When sufficient pressure is built up in the head chamber the pressure conditioning valve will then be opened and low pressure fluid will flow to the forward side of the feed lever operating mechanism 702 to force the feed lever 700 into the engaged position permitting the carriage to move in the forward direction again. Then initial slight forward movement of the lathe carriage will raise the roller 834 sufficiently from within the notch 872 to open the microswitch 842 and circuit permitting the spring 912 in the solenoid 871 to force the cocking lever 910 to the right. When the cocking lever is moved to the right the lug 894 will engage the pawl latch arm 906 so that the recess 902 in the pawl arm 900 will engage with the lug 894 on the piston rod of the selector valve to latch the valve in the open position. When the toolholder is advanced toward the workpiece the switch 887 will open the circuit to the solenoid 856 but the selector valve will be held in the retracted valve open position by the pawl 896 and the cocking lever 910.

Figure 8:
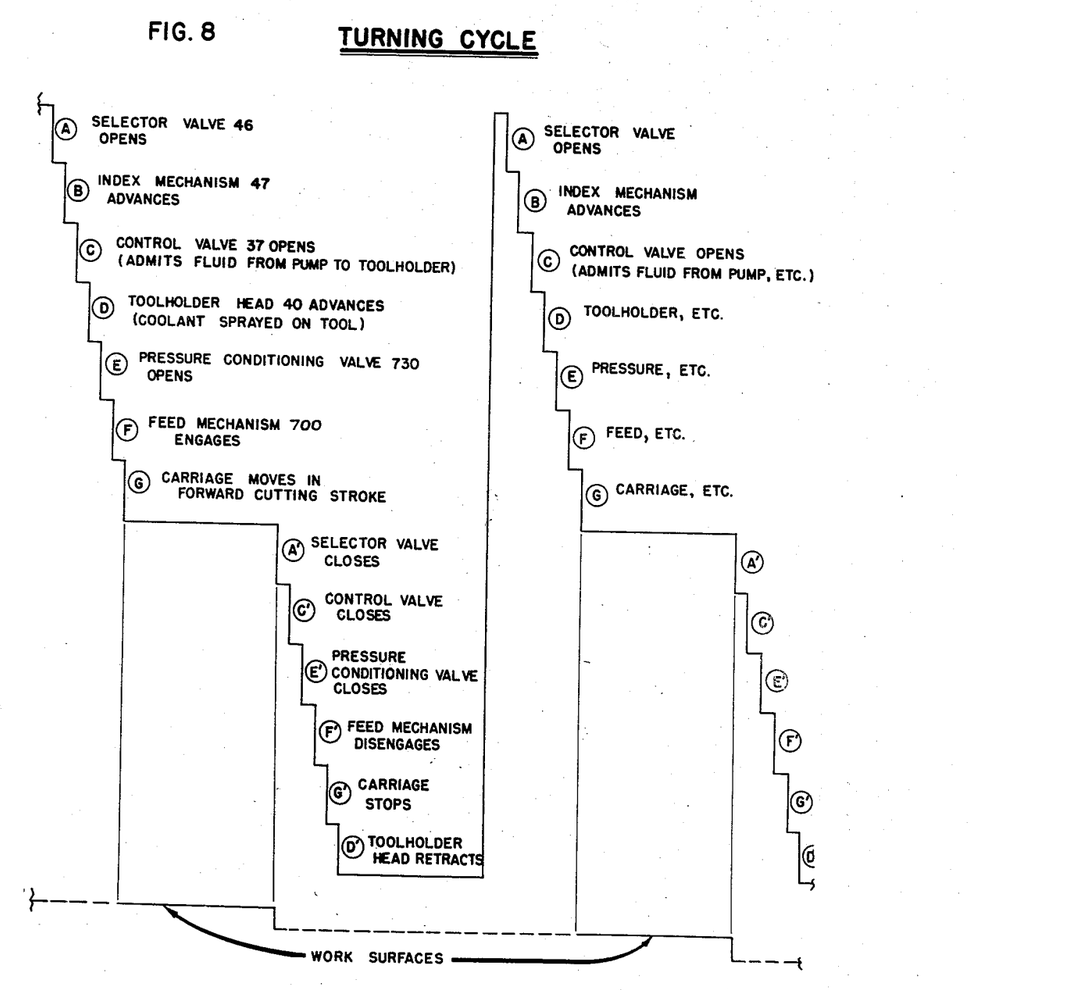
Fig. 8 illustrates in graphic form the operating sequence during automatic turning.

Fig. 8 represents in graphic form the sequence of operations employed for the various components in the automatic turning cycle. As stated in the description for chasing operation, the graphical presentation indicates the sequence of operations with delays indicated between operation of each component or components, however, these delays may be nonexistent depending on the interval of operation of each component. For simplicity, only one diameter from the initial set up is illustrated since the cycle of operations is identical for each diameter change.

Obviously many modifications and variations of the present invention are possible in the light of the above teachings. It is therefore to be understood that within the scope of the appended claims the invention may be practiced otherwise than as specifically described.

What is claimed is:

1. A system for controlling the application of power to a movable carriage having a work element carried thereby and to a movable feed mechanism of a machine tool comprising a pump, a selector valve operable in response to the position of the work element on the carriage to permit flow of an actuating fluid through said valve, valve means mounted on said carriage in communication with said pump and selector valve and actuated in response to the admission of fluid pressure from said selector valve for supplying fluid from said pump through the valve means and carriage to the work element as said valve means is actuated and a carriage return mechanism in fluid communication with said selector valve operable in response to actuation of said selector valve to a position to port fluid to the carriage return mechanism, and fluid actuated clutch means for effecting engagement and disengagement of the carriage with the feed mechanism therefor.

2. A system for controlling the application of power to a movable carriage having a nozzle and a work element carried thereby and to a movable carriage feed mechanism of a machine tool comprising a pump in communication with the nozzle, a selector valve operable in response to the position of the work element to permit flow of an actuating fluid through said valve, valve means mounted on the carriage in communication with said pump, nozzle and the selector valve and actuated in response to the admission of fluid pressure from said selector valve for supplying fluid under pressure from said pump by way of said valve means and the nozzle to said work element as said valve means is actuated, a carriage return mechanism in fluid communication with said selector valve operable in response to actuation of said selector valve to a position to port fluid to the carriage return mechanism, fluid actuated clutch means for effecting engagement and disengagement of the carriage with the carriage feed mechanism, said selector valve alternatively actuating said clutch into and out of engagement with the carriage feed mechanism, and said selector valve further actuating said carriage return mechanism at the end of each stroke and after said clutch has been disengaged from the carriage feed mechanism.

3. A system for controlling the application of power to a movable carriage having a nozzle and a work element carried thereby and to a movable carriage feed mechanism of a machine tool comprising a pump in communication with the nozzle, a selector valve operable in response to the position of the work element to permit flow of an actuating fluid through said valve, valve means mounted on the carriage in communication with said pump, nozzle and the selector valve and actuated in response to the admission of fluid pressure from said selector valve for supplying fluid under pressure from said pump by way of said valve means and the nozzle to said work element as said valve means is actuated, a carriage return mechanism in fluid communication with said selector valve operable in response to actuation of said selector valve to a position to port fluid to the carriage return mechanism, fluid actuated clutch means for effecting engagement and disengagement of the carriage with the carriage feed mechanism, said selector valve alternatively actuating said clutch into and out of engagement with the carriage feed mechanism, said selector valve further actuating said carriage return mechanism at the end of each stroke and after said clutch has been disengaged from the carriage feed mechanism, and a fluid actuated indexing mechanism operable by fluid pressure from said selector valve in accordance with the arrival of the work element at predetermined stations along the work for effecting a predetermined transverse positioning of the work element relative to the work for travel to the next station.

References Cited in the file of this patent

UNITED STATES PATENTS

| | | |
|---|---|---|
| 1,764,098 | Galloway | June 17, 1930 |
| 2,246,461 | Cannon | June 17, 1941 |
| 2,319,741 | Lovely | May 18, 1943 |
| 2,369,904 | McKee | Feb. 20, 1945 |
| 2,490,823 | Manning | Dec. 13, 1949 |
| 2,566,381 | Svenson | Sept. 4, 1951 |